United States Patent
Sandor

(10) Patent No.: US 7,812,071 B2
(45) Date of Patent: Oct. 12, 2010

(54) DECORATIVE FLOOR AND DECK FINISH AND METHOD FOR CREATING AND APPLYING SUCH A FINISH

(76) Inventor: Raymond Sandor, 3435 Aviation Blvd., Vero Beach, FL (US) 32960

( * ) Notice: Subject to any disclaimer, the term of this patent is extended or adjusted under 35 U.S.C. 154(b) by 0 days.

(21) Appl. No.: 11/935,038

(22) Filed: Nov. 5, 2007

(65) Prior Publication Data

US 2008/0108731 A1    May 8, 2008

Related U.S. Application Data

(60) Provisional application No. 60/857,712, filed on Nov. 8, 2006.

(51) Int. Cl.
*C08K 7/16* (2006.01)
*C08K 9/00* (2006.01)
*C08L 91/06* (2006.01)

(52) U.S. Cl. ............... 523/223; 523/200; 524/19; 524/40; 524/275; 524/507

(58) Field of Classification Search ............ 524/507, 524/451, 493, 275, 317, 19, 40; 428/36.4; 523/223, 200, 206; 427/154
See application file for complete search history.

(56) References Cited

U.S. PATENT DOCUMENTS 5,660,904 A * 8/1997 Andersen et al. ........... 428/36.4
6,686,412 B1 * 2/2004 Berschel et al. ............. 524/507

FOREIGN PATENT DOCUMENTS

JP           02117970 A  * 5/1990
WO PCT/US2007/083851    11/2007

OTHER PUBLICATIONS

"Aquamac 440: Thermoplastic Styrene Acrylic Latex Resin." Hexion Specialty Chemicals, Inc. Jan. 1, 2006.*
"Setalux." New Products for Industrial Wood Coating. European Coatings Show. Apr. 26-28, 2005, pp. 1-4.*

* cited by examiner

*Primary Examiner*—Vasu Jagannathan
*Assistant Examiner*—Hannah Pak
(74) *Attorney, Agent, or Firm*—Mayback & Hoffman, P.A.; Gregory L. Mayback; Rebecca A. Tie

(57) ABSTRACT

A veneer composition that includes a mixture of at least one of an acrylic emulsion and one or more hard resins and also includes at least about 60% by volume of translucent, uniformly spherical, non-resin, absorbent beads of at least one of acrylic and polypropylene.

17 Claims, 2 Drawing Sheets

PROPYLTEX WAX PROPERTIES

| TYPICAL PROPERTIES | 20 | 50 | 100S | 140S | 200S | 200SF | 270S | 325S |
|---|---|---|---|---|---|---|---|---|
| Melting Point of (ASTM D-127) °F | 330-335 | 330-335 | 320-338 | 320-338 | 320-338 | 320-338 | 320-338 | 320-338 |
| Melting Point of (ASTM D-127) °C | 166-168 | 166-168 | 160-170 | 160-170 | 160-170 | 160-170 | 160-170 | 160-170 |
| Density @ 25 °C g/cc | 0.90 | 0.90 | 0.86 | 0.86 | 0.86 | 0.86 | 0.86 | 0.86 |
| Screen Analysis: Maximum Particle Size (microns) | 840 (20 mesh) | 300 (50 mesh) | 149 (100 mesh) | 105 (140 mesh) | 74 (200 mesh) | 74 (200 mesh) | 53 (270 mesh) | 44 (325 mesh) |
| Microtrac Laser Analysis Mean Particle Size (microns) | N/A | 160-180 | 80-100 | 45-55 | 35-45 | 25-35 | 15-25 | 11-15 |

FIG. 3

DECORATIVE FLOOR AND DECK FINISH AND METHOD FOR CREATING AND APPLYING SUCH A FINISH

CROSS-REFERENCE TO RELATED APPLICATION

This application claims the benefit under 35 U.S.C. §119 (e) of U.S. Provisional Application No. 60/857,712 filed Nov. 8, 2006, the complete disclosure of which is hereby incorporated by reference herein in its entirety.

FIELD OF THE INVENTION

The invention lies in the field of floorings, in particular, decorative artwork and faux effects that can be applied over a concrete floor or deck.

BACKGROUND OF THE INVENTION

Concrete overlay is term used to describe a hard veneer commonly used to produce a hard and durable surface on top of a concrete floor or deck. In prior art products and methods, to create such a veneer, concrete is provided as one of the ingredients. In the process of forming the concrete overlay, a bonder or primer coat is applied to an existing concrete underfloor. Then, a layer of a material including Portland cement fortified with an acrylic emulsion is applied. This material layer provides an increase in the bonding efficiency and gives the veneer some flexibility. Color, colored chips, stones, or other particulate matter can be added into the overlay mixture before, in, and/or on top of the concrete veneer. The veneer is allowed to dry and, when dry, the veneer can be stained or color-washed to produce a decorative color surface.

There are problems associated with such prior art concrete veneers and veneer processes, the most prominent of which is that it can be used to produce only limited decorative effects. The material is opaque and cannot offer any depth of color, even when color is applied on top or mixed into the veneer. Thus, any further overlaying of concrete or concrete veneer on top of a first layer will opaque or entirely block out the underlying artwork and/or color, rendering this artwork undetectable. Moreover, it is difficult to produce any kind of thin decorative stencil patterns or other decorative effects with this cementaceous material due to its physical properties and to the irregular sandy nature of the concrete itself. Also, if color chips are added or applied on top of the wet concrete veneer, they can only produce random color specks in the concrete material.

Therefore, it would be desirable to provide a concrete veneer that, when applied, does not visually opaque the underlying artwork or color and that allows addition of color and other visual effects, such as chips, that can be seen to varying depths within the veneer. It would further be desirable for the applied veneer to permit sharp, and even, and thin definitions in artwork using the same new veneering material and, thereby, produce decorative effects.

SUMMARY OF THE INVENTION

It is accordingly an object of the invention to provide a decorative floor and deer finish and methods for creating and applying such a finish that overcome the hereinafore-mentioned disadvantages of the heretofore-known devices and methods of this general type and that do not visually block out the underlying artwork or visible characteristics, that allows addition of color and other visual effects able to be seen to varying depths within the veneer, and that permits sharp, even, and thick or thin definitions in veneer artwork to produce decorative and desirable visual effects.

The present invention is a new material that can be used as a hard durable, transparent veneer over concrete and provides novel processes for using this material to control sharp, even, and thick or thin definitions in artwork and, thereby, provide decorative visual effects. This hard, durable, and transparent veneer is placed over concrete and similar substrates and, in general, can be used as an overlay finishing system.

The novel material is a mixture of acrylic emulsions or other combinations of hard resin emulsions combined with a high ratio of at least 60% by volume of impact strong, transparent/translucent, uniformly spherical, non-resin, absorbent beads of acrylic, polypropylene, or other similar particulate materials that are conventionally used merely as paint texturing materials and anti-skid additives when provided in low concentrations (of the overall volume of the paint material). The high-particle-volume material of the present invention produces a workable translucent paste that dries to a hard transparent or translucent veneer and has durability similar to concrete but with a more uniform texture and a translucent appearance when dry.

A ratio of the transparent or translucent spherical uniform particles to the resin emulsion is very high so that almost all particles touch one another. When the constituents are combined together, the mixture creates a self-locking and almost self-supporting mass of uniform particles. A high percentage of uniform, spherical partials in the mix ratio can be accomplished because of the properties associated with substantially spherical beads. Almost every spherical bead in the present invention is allowed to touch another bead. Because each bead is spherical, connecting geometries form open physical spaces between the beads sufficiently large enough to allow the resin to be disposed therein and, after such placement, to dry and form a relatively smooth upper surface. The resin simultaneously bonds the mixture to the substrate while acting as a binder to the high-ratio-particle load within the material mix.

When mixed, the material is pasty. This pasty material is applied by being troweled or sprayed on the surface on which the veneer is to be created. The material also may be tinted by adding a commercial colorant(s), for example. The pasty material bonds directly to concrete, pre-painted concrete, or similar substrates. Because the paste has a substantially uniform particle consistency, it resists running or creeping when placed under stencil or tape edges. This finely controllable characteristic allows the artist to produce sharp, clean, decorative design work with the paste, such as stencil art or pre-taped decorative patterns, and the designs can be applied a first, second, or later coat applications. Decorative stencil patterns are commonly accomplished by using small amounts of color that are applied in a very thin, almost dry paint color process by a pouncing on almost dry paint color. Such application keeps the material from running under the edges of a stencil pattern placed over a substrate. Thicker and wetter stencil applications of paints and other materials tend to run under the defined edges of the stencil pattern, which results in poor decorative pattern definitions. The novel paste material containing the spherical particles resists running under any stencil pattern edges and may be applied very thin or very thick, and even by being troweled on over a decorative stencil; when the stencil is removed, the new paste material remains in place, which offers the ability to have sharp stencil definitions even in thickly applied stenciling applications. In addition, the decorative pattern is as durable as the material base to which it is applied. When dry, thickly applied patterns may be fine-sanded and polished for an extra decorative effect.

The translucent nature of the paste material allows the user to apply, if desired, a protective leveling overcoat veneer on top of the artwork. Such an overcoat application forms a tough, protecting veneer that may also be color glazed when dry and, as such, can add to and improve upon the decorative therebeneath while also being a durable surface.

Mutable layers can be formed by applying this translucent material in different pre-tinted color layers, or by applying decorative stencil effects or other decorative color embellishments using the material itself. Decorative effects may be produced in any or ail of these layers, creating a translucent multi-layer appearance in a concrete surface.

Due to the transparent or translucent properties of the paste material, metallic particles or metallic colored mica flakes may also he added to the material to create a metallic visual appearance. This metal-colored paste is applied to the substrate and produces a hard and durable metal-like finish when dry. The metallic paste may also be applied as decorative stenciling or design over any layer of the material.

BRIEF DESCRIPTION OF THE DRAWINGS

FIG. 3 is a chart describing properties of an exemplary emulsion used in the process according to the invention.

DESCRIPTION OF THE PREFERRED EMBODIMENTS

Figure 1:
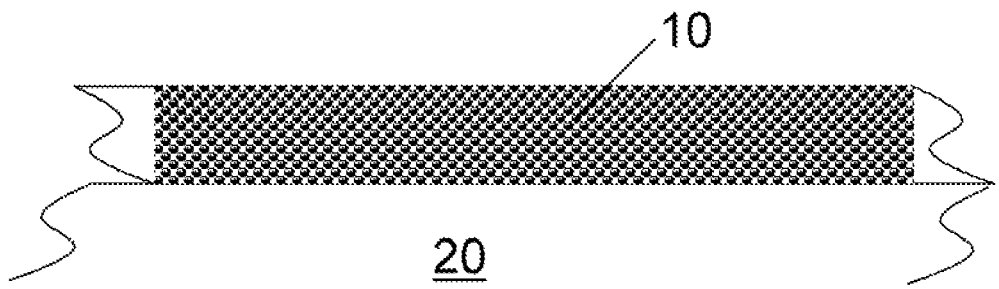
FIG. 1 is a fragmentary, enlarged diagrammatic illustration of a veneer according to the invention.
Figure 2:
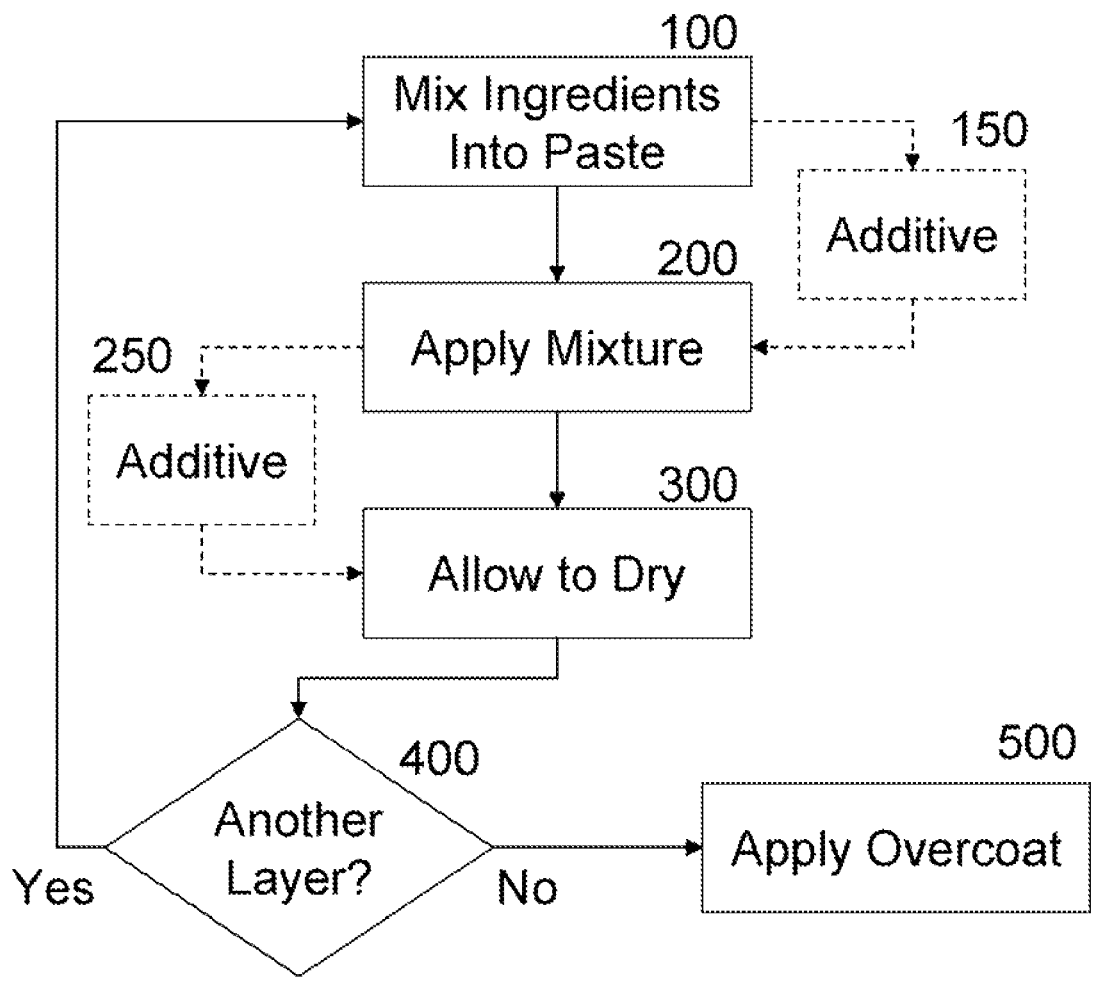
FIG. 2 is a flow chart illustrating the steps according to an exemplary embodiment of the invention.

Referring now to the figures of the drawings in detail and first, particularly to FIG. 1 thereof, there is shown a diagrammatic illustration of a veneer made according to an exemplary process of the present invention, which process is described with respect to the flow chart of FIG. 2.

At least one layer of concrete veneer 10 is to be applied to a concrete surface or other hard substrate surfaces 20, such as Formica, tile, stucco, and hard wallboards. In a first step 100 for making this decorative finish on a floor or deck, for example, an emulsion, whether acrylic or a combination of hard resins, is combined with a high ratio of impact strong, uniformly spherical, non-resin, absorbent beads. For purposes of the present invention, a hard resin is any resin that upon exposure to air, solidifies and becomes hard and brittle. The ratio of the spherical uniform particles to the resin emulsion (e.g., Aquamac 550 Styrene Acrylic) is sufficiently high to allow almost every spherical bead in the present invention to touch at least one other bead. For example, the beads can be between approximately 60% to 90% by volume, and the liquid resin fills in the open spaces between the spherical particles. The resin can be between approximately 10% to 30% by volume. Spherical particle sizes range from 15 to 300 mean particle size microns. There can be, for example, four grades of the particle-containing resin: "Course"=150 to 300 micron particles; "General"=50 to 150 micron particles; "Fine"=25 to 50 micron particles; and "Super Fine"=15 to 25 micron particles. In step 100, the material is mixed to a consistency of paste.

The liquid resin emulsion can be, for example, a 550 Aquamac supplied by BASF. The spherical beads can be, for example, Propyltex wax beads that resist melting to over 300° F. supplied by Micro Powder, Inc. Propyltex waxes are micronized polypropylenes manufactured to provide a texturizing agent material having a controlled particle size that give a uniform surface textured surface in paints and coatings. Typical properties of such waxes are set forth in the table of FIG. 3.

The transparent or translucent beads are made from acrylic, polypropylene, or other similar particulate materials that are conventionally used as either paint texturing materials or anti-skid additives when provided in a low concentration with respect to the overall volume of the paint material. See FIG. 3.

When in this desired pasty consistency, the high-particle-volume material is a user-workable. The artist applies, in step 200, the material 10 to the surface 20 with a trowel and/or with a sprayer.

In step 300, the artist allows the material to dry. Dry-curing of the resin 10 simultaneously binds the beads against one another and bonds the mixture to the substrate 20. When finally dry, the resin 10 is a veneer 10 having a concrete-like durability and a smooth surface and is transparent or translucent. Because, the veneer 10 dries transparently or translucently, second, third, or even more coats can be applied (see step 400), each, of these coats having similar or different artistic properties (shade, opacity, color, pattern, etc.).

Optionally (as indicated by dashed lines in FIG. 2), a universal color tint or other pre-dispersed color, dry ground color, or textural additive may be included in the initial mixture (step 150) or can be applied to the mixture already applied onto the substrate 20 (step 250). Similarly, metallic particles or metallic colored mica such as Engelhard Corporation color mica powders and flakes may also be added to the material at these stages to create a metallic appearance.

If desired, in step 500, a protective leveling overcoat veneer can be applied on top of the artwork.

The invention claimed is:

1. A veneer composition comprising:
an emulsion being one of:
acrylic; and
one or more hard resins; and
a concentration of between about 60 to 90% by volume of spherical, non-resin beads evenly mixed within the emulsion wherein the concentration of the spherical beads places each spherical bead in physical contact with at least one other spherical bead in the composition.

2. The composition according to claim 1, wherein:
the emulsion is Styrene Acrylic.

3. The composition according to claim 1, wherein:
a diameter of the spherical beads ranges from about 15 to about 300 microns.

4. The composition according to claim 1, wherein:
a consistency of the composition is pasty.

5. The composition according to claim 1, wherein:
the spherical beads are absorbent.

6. The composition according to claim 1, wherein:
the spherical beads are Propyltex wax.

7. The composition according to claim 1, further comprising:
metallic particles.

8. A method of making a veneer, the method comprising:
combining an emulsion with an amount of spherical, non-resin beads to form a composition wherein the spherical beads are added to the emulsion until the amount of the spherical beads is between about 60 to 90% by volume of a total mixture and wherein the amount of the spherical beads is sufficient for each spherical bead in the composition to make physical contact with at least one other spherical bead.

9. The method according to claim 8, further comprising:
adding the spherical beads until the consistency of the composition is pasty.

10. The method according to claim 8, wherein:
the emulsion is one of:
- acrylic; and
- one or more hard resins.

11. The method according to claim 8, wherein:
the emulsion is Styrene Acrylic.

12. The method according to claim 8, wherein:
a diameter of the spherical beads ranges from about 15 to about 300 microns.

13. The method according to claim 8, further comprising:
adding metallic particles to the composition.

14. The method according to claim 8, further comprising:
adding colorant to the composition.

15. The method according to claim 8, further comprising:
applying the composition to a surface.

16. A veneer composition, comprising:
a mixture of at least one of:
an acrylic emulsion; and
one or more hard resins;
at least about 60% by volume concentration of translucent, uniformly spherical, non-resin, absorbent beads of at least one of:
acrylic; and
polypropylene; and
wherein the concentration of the spherical beads places each spherical bead in physical contact with at least one other spherical bead in the composition.

17. The veneer according to claim 16, further comprising:
at least one of:
- metallic particles;
- metallic colored particles; and
- a colorant.

* * * * *